(12) United States Patent
Oki et al.

(10) Patent No.: US 11,289,941 B2
(45) Date of Patent: Mar. 29, 2022

(54) UNINTERRUPTIBLE POWER SUPPLY

(71) Applicant: FUJI ELECTRIC CO., LTD., Kawasaki (JP)

(72) Inventors: Shota Oki, Kobe (JP); Takuya Kimizu, Akashi (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/910,265

(22) Filed: Jun. 24, 2020

(65) Prior Publication Data

US 2020/0321801 A1    Oct. 8, 2020

Related U.S. Application Data

(63) Continuation of application No. PCT/JP2019/021211, filed on May 29, 2019.

(30) Foreign Application Priority Data

Jul. 19, 2018    (JP) .............................. JP2018-135515

(51) Int. Cl.
| | |
|---|---|
| *H02J 9/06* | (2006.01) |
| *H02M 1/10* | (2006.01) |
| *H02M 7/48* | (2007.01) |

(52) U.S. Cl.
CPC ............... *H02J 9/062* (2013.01); *H02M 1/10* (2013.01); *H02M 7/48* (2013.01)

(58) Field of Classification Search
CPC .......... H02M 5/458; H02M 7/48; H02M 1/10; H02J 9/062
See application file for complete search history.

(56) References Cited

U.S. PATENT DOCUMENTS

| | | | |
|---|---|---|---|
| 9,614,458 B1* | 4/2017 | Alexander | H02S 50/10 |
| 2008/0088183 A1* | 4/2008 | Eckroad | H02J 3/1842 307/66 |
| 2013/0200699 A1* | 8/2013 | Origane | H02J 1/04 307/10.6 |
| 2016/0172900 A1* | 6/2016 | Welch, Jr. | H05K 7/1492 307/64 |
| 2016/0181861 A1* | 6/2016 | Familiant | H02J 9/06 307/66 |
| 2017/0149276 A1* | 5/2017 | Toyoda | H02J 9/062 |

(Continued)

FOREIGN PATENT DOCUMENTS

| | | |
|---|---|---|
| CN | 103701191 A | 4/2014 |
| JP | H02-294238 A | 12/1990 |

(Continued)

OTHER PUBLICATIONS

PCT/ISA/210, "International Search Report for International Application No. PCT/JP2019/021211," dated Aug. 6, 2019.

(Continued)

*Primary Examiner* — Jared Fureman
*Assistant Examiner* — Esayas G Yeshaw
(74) *Attorney, Agent, or Firm* — Manabu Kanesaka

(57) ABSTRACT

In an uninterruptible power supply, a signal generator generates a semiconductor switch drive signal for driving a semiconductor switch and continuously generates the semiconductor switch drive signal while AC power is being supplied via a bypass circuit.

9 Claims, 3 Drawing Sheets

(56) References Cited

U.S. PATENT DOCUMENTS

2018/0309319 A1* 10/2018 Nakano ............... H02J 9/06
2018/0375372 A1   12/2018 Toyoda
2019/0064274 A1*  2/2019 Fu ..................... H02J 9/062
2020/0185960 A1*  6/2020 Toyoda ............... H02J 9/062

FOREIGN PATENT DOCUMENTS

| JP | H08-205423 A | 8/1996 |
| JP | 2016-049011 A | 4/2016 |
| WO | 2017/094142 A1 | 6/2017 |

OTHER PUBLICATIONS

PCT/ISA/237, "Written Opinion by the International Search Authority for International Application No. PCT/JP2019/021211," dated Aug. 6, 2019.

\* cited by examiner

UNINTERRUPTIBLE POWER SUPPLY

CROSS-REFERENCE TO RELATED APPLICATION

This application is a continuation of PCT application PCT/JP2019/021211, filed on May 29, 2019, which is based upon and claims priority of Japanese patent application No. 2018-135515, filed on Jul. 19, 2018, the entire contents of which are incorporated herein by reference.

BACKGROUND OF THE INVENTION

Field of the Invention

The present invention relates to an uninterruptible power supply, and more particularly, it relates to an uninterruptible power supply including a bypass circuit that supplies AC power to a load without causing the AC power to pass through a converter and an inverter.

Description of the Background Art

An uninterruptible power supply including a bypass circuit that supplies AC power to a load without causing the AC power to pass through a converter and an inverter is known in general. Such an uninterruptible power supply is disclosed in Japanese Patent Laid-Open No. 8-205423, for example.

An uninterruptible power supply disclosed in Japanese Patent Laid-Open No. 8-205423 includes a converter that converts AC power of an AC power supply into DC power and an inverter that converts the DC power from the converter into AC power and supplies the AC power to a load. Furthermore, the uninterruptible power supply includes a DC power supply that is connected between the converter and the inverter and supplies power to the load when the AC power supply is abnormal. In addition, the uninterruptible power supply disclosed in Japanese Patent Laid-Open No. 8-205423 includes a bypass circuit that supplies the AC power from the AC power supply to the load without causing the AC power to pass through the converter and the inverter. Furthermore, the bypass circuit includes a semiconductor switch and a switch connected in parallel to the semiconductor switch.

In the uninterruptible power supply disclosed in Japanese Patent Laid-Open No. 8-205423, during normal operation, AC power is supplied from the AC power supply to the load via the converter and the inverter. When AC power cannot be supplied to the load via the converter and the inverter due to a failure, for example, both the semiconductor switch and the switch connected in parallel to the semiconductor switch are turned on such that AC power is supplied from the AC power supply to the load via the bypass circuit.

Although not explicitly described in Japanese Patent Laid-Open No. 8-205423, in a conventional uninterruptible power supply in which a semiconductor switch and a switch are provided in a bypass circuit, generally, it takes time for the switch (mechanical switch) to turn on, and thus the semiconductor switch is turned on until the switch is reliably turned on. After the switch is reliably turned on, the semiconductor switch is turned off. Moreover, once the switch is turned on, the switch remains on until a signal for turning the switch off is input.

However, in the uninterruptible power supply described in Japanese Patent Laid-Open No. 8-205423, both the semiconductor switch and the switch are provided in the bypass circuit, and thus the configuration of the uninterruptible power supply becomes relatively complex.

SUMMARY OF THE INVENTION

The present invention has been proposed in order to solve the aforementioned problem, and an object of the present invention is to provide an uninterruptible power supply that can supply AC power from a bypass circuit to a load while significantly reducing or preventing the complex configuration.

In order to attain the aforementioned object, an uninterruptible power supply according to an aspect of the present invention includes a converter that converts AC power from an AC power supply into DC power, an inverter that converts the DC power from the converter into AC power and supplies the converted AC power to a load, a bypass circuit connected in parallel to the converter and the inverter between the AC power supply and the load, the bypass circuit supplying the AC power from the AC power supply to the load, a semiconductor switch provided in the bypass circuit, a controller configured or programmed to control driving of the semiconductor switch, an abnormality detector that detects an abnormality in the controller, and a signal generator that generates a semiconductor switch drive signal for driving the semiconductor switch, separately from a drive signal for driving the semiconductor switch from the controller when the abnormality in the controller is detected by the abnormality detector. The signal generator continuously generates the semiconductor switch drive signal while the AC power is being supplied via the bypass circuit.

In the uninterruptible power supply according to this aspect of the present invention, as described above, the signal generator continuously generates the semiconductor switch drive signal while the AC power is being supplied via the bypass circuit. Accordingly, while the AC power is being supplied via the bypass circuit, the on-state of the semiconductor switch is maintained. Therefore, the AC power can be supplied from the bypass circuit to the load via the semiconductor switch. Moreover, the on-state of the semiconductor switch is maintained while the AC power is being supplied via the bypass circuit, and thus it is not necessary to provide a mechanical switch separately from the semiconductor switch. Thus, the AC power can be supplied from the bypass circuit to the load while the complex configuration is significantly reduced or prevented.

In the aforementioned uninterruptible power supply according to this aspect, the semiconductor switch preferably includes at least one semiconductor switching element, and the AC power is preferably supplied to the load via the semiconductor switch. Accordingly, the bypass circuit does not include a mechanical switch, and thus the configuration of the bypass circuit can be reliably simplified. Note that a control to switch supply of AC power to the load from supply from the inverter to supply from the bypass circuit can also be simplified.

In the aforementioned uninterruptible power supply according to this aspect, the abnormality detector preferably outputs a controller abnormality signal when detecting the abnormality in the controller, and the signal generator preferably generates a bypass power supply signal indicating that the AC power is being supplied via the bypass circuit based on the controller abnormality signal that has been output, and continuously generates the semiconductor switch drive signal by latching the bypass power supply signal while generating the bypass power supply signal. Accordingly, the bypass power supply signal is latched, and thus the signal generator can reliably continuously generate the semiconductor switch drive signal while generating the bypass power supply signal.

In the aforementioned uninterruptible power supply according to this aspect, the signal generator preferably stops generation of the semiconductor switch drive signal based on a semiconductor switch abnormality signal indicating that the semiconductor switch is abnormal. Accordingly, when the semiconductor switch is abnormal, generation of the semiconductor switch drive signal is stopped based on the semiconductor switch abnormality signal such that supply of the AC power from the bypass circuit to the load can be easily stopped.

In the aforementioned uninterruptible power supply according to this aspect, the signal generator preferably stops generation of the semiconductor switch drive signal based on a bypass power supply cancellation signal for canceling supply of the AC power to the load via the bypass circuit. Accordingly, when it is desired to stop supply of the AC power to the load via the bypass circuit (by user's discretion), supply of the AC power to the load via the bypass circuit can be stopped based on the bypass power supply cancellation signal.

The aforementioned uninterruptible power supply according to this aspect preferably further includes a DC power supply connected between the converter and the inverter, the DC power supply supplying power to the load when the AC power supply is abnormal, the AC power supply preferably includes a first AC power supply that supplies AC power to the converter, and a second AC power supply that supplies AC power to the bypass circuit, and the signal generator is preferably driven by the power of any one of the DC power supply, the first AC power supply, and the second AC power supply. Accordingly, even when any one of the DC power supply, the first AC power supply, and the second AC power supply fails, the signal generator can be driven by another power supply that has not failed.

In the aforementioned uninterruptible power supply according to this aspect, the AC power is preferably supplied from the AC power supply to the load via the bypass circuit when the AC power supply is normal. Accordingly, when the AC power supply is normal, the AC power is supplied from the AC power supply to the load via the bypass circuit without passing through the converter and the inverter, and thus a power loss due to power conversion of the converter and the inverter can be significantly reduced or prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

The configuration of an uninterruptible power supply 100 according to this embodiment is now described with reference to FIGS. 1 and 2.

(Configuration of Uninterruptible Power Supply)

Figure 1:
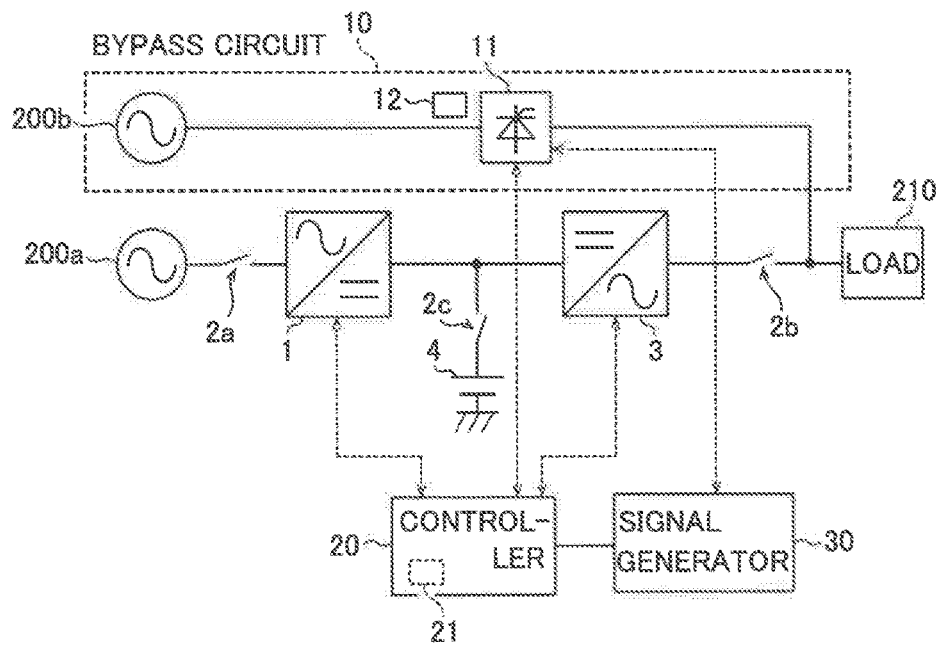
FIG. 1 is a block diagram showing the overall configuration of an uninterruptible power supply according to an embodiment.

As shown in FIG. 1, the uninterruptible power supply 100 includes a converter 1. The converter 1 is configured to convert AC power from an AC power supply 200a into DC power. A mechanical switch 2a is provided between the AC power supply 200a and the converter 1. The AC power supply 200a is an example of a "first AC power supply" in the claims.

The uninterruptible power supply 100 includes an inverter 3. The inverter 3 is configured to convert the DC power from the converter 1 into AC power and supply the converted AC power to a load 210. A mechanical switch 2b is provided between the inverter 3 and the load 210.

The uninterruptible power supply 100 includes a DC power supply 4. The DC power supply 4 is connected between the converter 1 and the inverter 3, and is configured to supply power to the load 210 when the AC power supply 200a is abnormal. Specifically, the DC power of the DC power supply 4 is converted into AC power by the inverter 3 and supplied to the load 210. A mechanical switch 2c is provided between the DC power supply 4 and both the converter 1 and the inverter 3.

The uninterruptible power supply 100 includes a bypass circuit 10. The bypass circuit 10 is connected in parallel to the converter 1 and the inverter 3 between the AC power supply 200b and the load 210, and is configured to supply AC power from the AC power supply 200b to the load 210. Furthermore, the bypass circuit 10 includes a semiconductor switch 11. The semiconductor switch 11 includes thyristors connected in antiparallel, for example. In this embodiment, the bypass circuit 10 is not provided with a mechanical switch 311 (see FIG. 3) arranged in parallel to the semiconductor switch 11. The semiconductor switch 11 includes at least one semiconductor switching element, and AC power is supplied to the load 210 via the semiconductor switch 11. The uninterruptible power supply 100 according to this embodiment supplies power by driving only the semiconductor switch 11 during bypass power supply. On the other hand, a conventional uninterruptible power supply 300 supplies power mainly by closing the mechanical switch 311 during bypass power supply, and a semiconductor switch 11 is used as an auxiliary when the mechanical switch 311 is opened and closed. The AC power supply 200b is an example of a "second AC power supply" in the claims.

The uninterruptible power supply 100 includes a controller 20. The controller 20 is configured or programmed to control the entire uninterruptible power supply 100. For example, the controller 20 controls driving of the semiconductor switch 11, the converter 1, and the inverter 3. Furthermore, the controller 20 is configured or programmed to be able to arbitrarily generate a drive signal (a semiconductor switch closing command; see FIG. 2) for driving (turning on and off) the semiconductor switch 11.

The uninterruptible power supply 100 includes an abnormality detector 21. The abnormality detector 21 is configured to detect an abnormality in the controller 20. The abnormality in the controller 20 refers to runaway of a central processing unit (CPU) of the controller 20, an abnormal clock of a field-programmable gate array (FPGA) of the controller 20, or a reduction in voltage from a control power supply (not shown) that supplies power to the controller 20, for example. The abnormality detector 21 is arranged on a control board provided in the controller 20, for example. Furthermore, the abnormality detector 21 is configured to output a controller abnormality signal (see FIG. 2) when detecting an abnormality in the controller 20.

Figure 2:
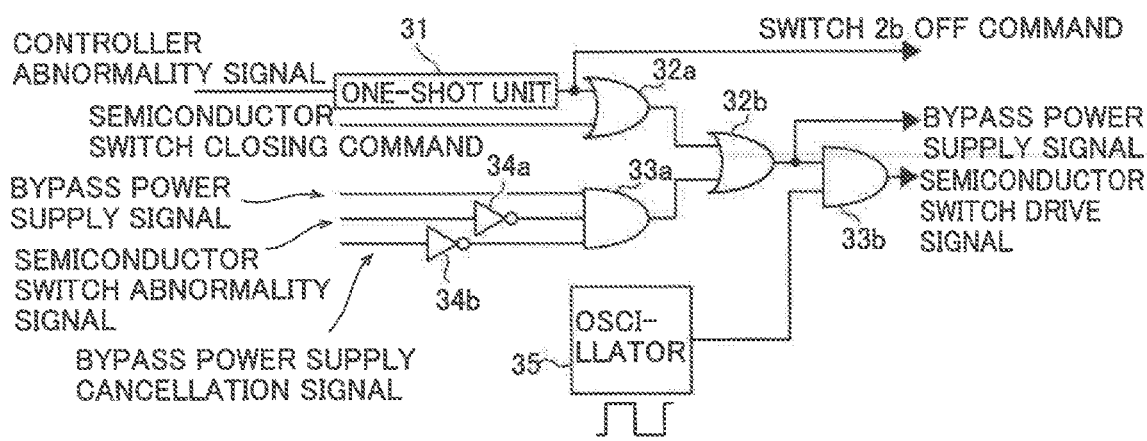
FIG. 2 is a block diagram showing the configuration of a signal generator of the uninterruptible power supply according to the embodiment.

As shown in FIGS. 1 and 2, the uninterruptible power supply 100 includes a signal generator 30. In this embodiment, the signal generator 30 is configured to generate a semiconductor switch drive signal (see FIG. 2) for driving the semiconductor switch 11, separately from the drive signal (semiconductor switch closing command) for driving the semiconductor switch 11 from the controller 20 when an abnormality in the controller 20 is detected by the abnormality detector 21. Furthermore, the signal generator 30 is configured to continuously generate the semiconductor switch drive signal while AC power is supplied via the bypass circuit 10. The configuration of the signal generator 30 is specifically described below.

(Specific Configuration of Signal Generator)

In this embodiment, as shown in FIG. 2, the signal generator 30 is configured to generate a bypass power supply signal indicating that AC power is being supplied via the bypass circuit 10 based on the controller abnormality signal output from the abnormality detector 21. Furthermore, the signal generator 30 is configured to continuously generate the semiconductor switch drive signal by latching the bypass power supply signal while generating the bypass power supply signal.

Specifically, the signal generator 30 includes a one-shot unit 31, an OR circuit 32a, an OR circuit 32b, an AND circuit 33a, and an AND circuit 33b. The controller abnormality signal output from the abnormality detector 21 is input to the one-shot unit 31. An output from the one-shot unit 31 and the semiconductor switch closing command are input to the OR circuit 32a. The semiconductor switch closing command is output from the controller 20 at an arbitrary timing.

An output from the OR circuit 32a and an output from the AND circuit 33a are input to the OR circuit 32b. An output from the OR circuit 32b is output as a bypass power supply signal, and is input to the AND circuit 33b.

The AND circuit 33a receives the bypass power supply signal. In addition, a semiconductor switch abnormality signal indicating that the semiconductor switch 11 is abnormal is input to the AND circuit 33a via a NOT circuit 34a. The semiconductor switch abnormality signal is output from a semiconductor switch abnormality detector 12 when the semiconductor switch abnormality detector 12 (see FIG. 1) detects an abnormality in the semiconductor switch 11. The abnormality in the semiconductor switch 11 refers to a temperature abnormality in the semiconductor switch 11, for example. A bypass power supply cancellation signal for canceling supply of AC power to the load 210 via the bypass circuit 10 is input to the AND circuit 33a via a NOT circuit 34b. The bypass power supply cancellation signal is output from the controller 20 at an arbitrary timing.

An output from the OR circuit 32b and an output (pulse wave) from an oscillator 35 are input to the AND circuit 33b. Then, the AND circuit 33b outputs a semiconductor switch drive signal based on the logical product of the output from the OR circuit 32b and the output from the oscillator 35.

In this embodiment, the signal generator 30 is configured to be driven by any one of the DC power supply 4, the AC power supply 200a that supplies AC power to the converter 1 and the AC power supply 200b that supplies AC power to the bypass circuit 10. That is, when any one of the DC power supply 4, the AC power supply 200a, and the AC power supply 200b fails, power is supplied to the signal generator 30 from another power supply that has not failed. The OR circuit 32a, the OR circuit 32b, the AND circuit 33a, the AND circuit 33b, etc. of the signal generator 30 are hardware-configured.

(Operation of Signal Generator)

Figure 3:
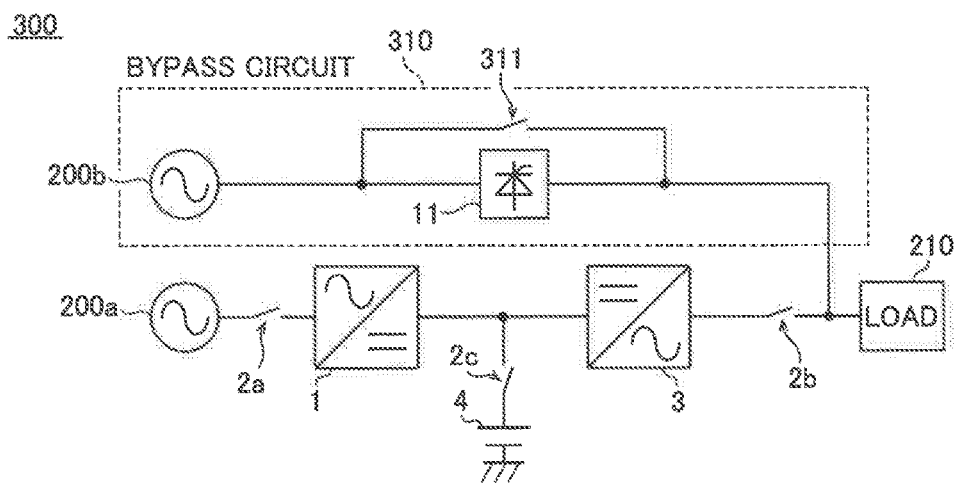
FIG. 3 is a diagram showing the configuration of an uninterruptible power supply according to a comparative example.
Figure 4:
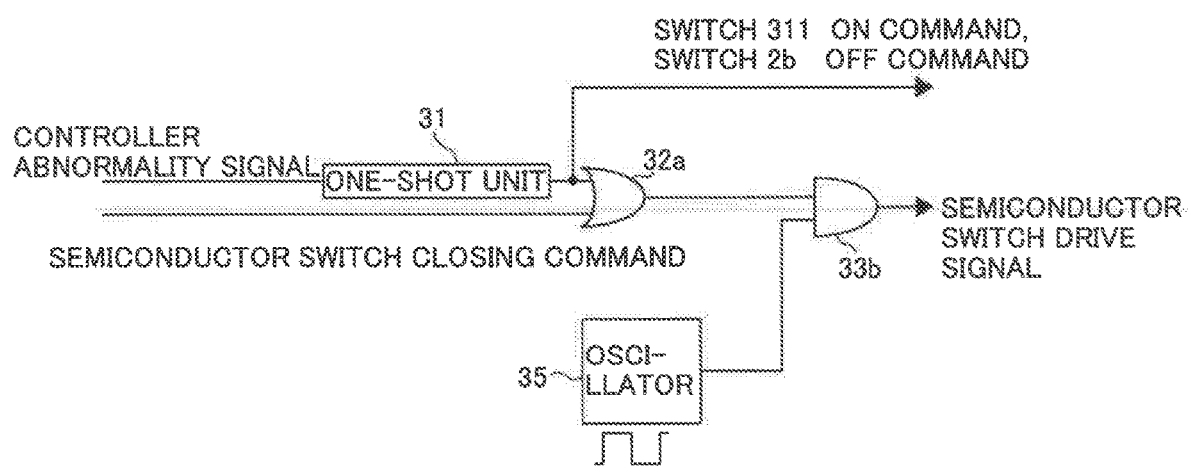
FIG. 4 is a block diagram showing the configuration of a signal generator of the uninterruptible power supply according to the comparative example.

The operation of the signal generator 30 is now described in comparison with the uninterruptible power supply 300 according to a comparative example shown in FIGS. 3 and 4.

Comparative Example

As shown in FIG. 3, in the uninterruptible power supply 300 according to the comparative example, a bypass circuit 310 includes the mechanical switch 311 in parallel to the semiconductor switch 11. As shown in FIG. 4, the uninterruptible power supply 300 according to the comparative example does not include an OR circuit 32b or an AND circuit 33a, unlike the uninterruptible power supply 100 (see FIG. 2) according to this embodiment.

Figure 5:
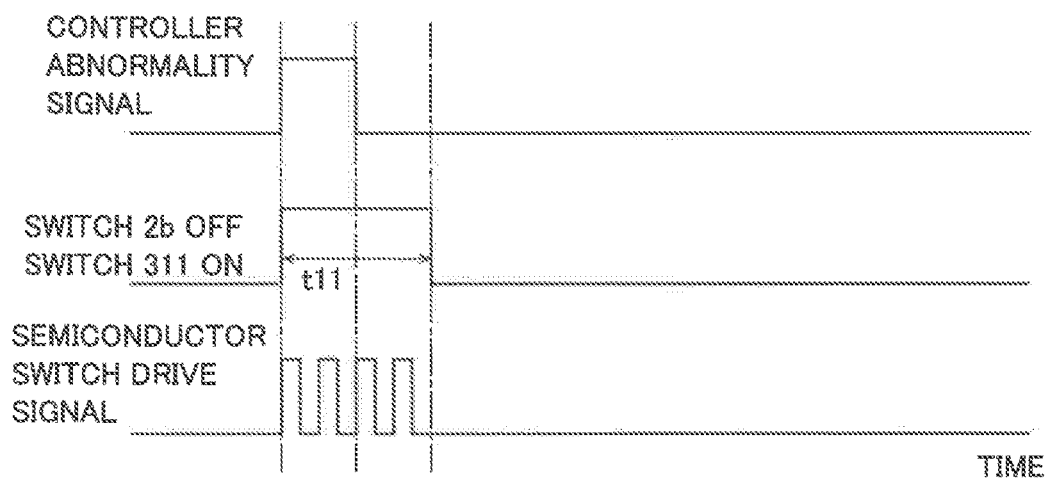
FIG. 5 is a timing chart showing the operation of the signal generator of the uninterruptible power supply according to the comparative example.

As shown in FIG. 5, in the uninterruptible power supply 300 according to the comparative example, an H-level controller abnormality signal is input to a one-shot unit 31 (see FIG. 4) such that an H-level one-shot signal is output during a period t11. Then, the signal output from the one-shot unit 31 is input to the mechanical switch 311 (see FIG. 3) such that the mechanical switch 311 is turned on. Furthermore, the signal output from the one-shot unit 31 is input to a mechanical switch 2b (see FIG. 3) such that the mechanical switch 2b is turned off.

As shown in FIG. 4, the signal output from the one-shot unit 31 is input to an AND circuit 33b. An output from an oscillator 35 is also input to the AND circuit 33b. Thus, a semiconductor switch drive signal is output from the AND circuit 33b. As shown in FIG. 5, the semiconductor switch drive signal is output until the mechanical switch 311 is reliably turned on (period t11), and after the mechanical switch 311 is reliably turned on, the semiconductor switch drive signal is not output.

Operation in the Event of Abnormality in this Embodiment

Figure 6:
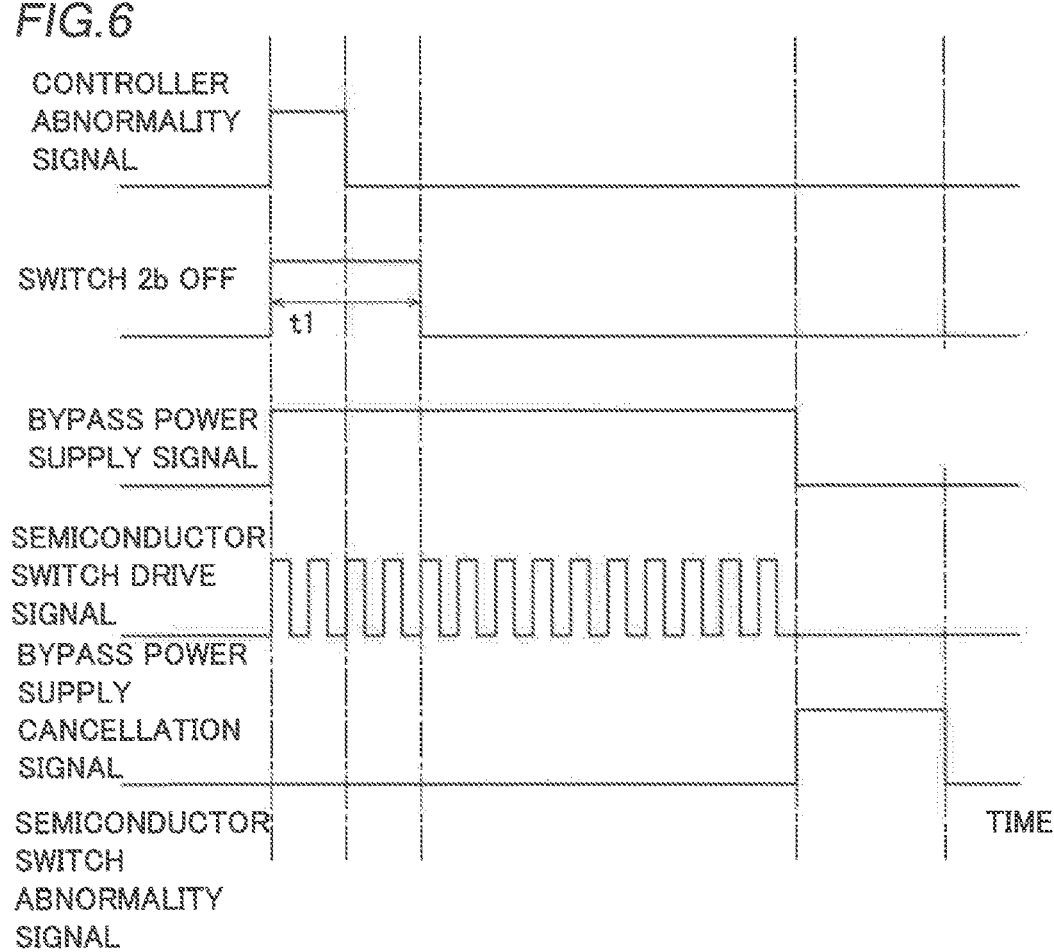
FIG. 6 is a timing chart showing the operation of the signal generator of the uninterruptible power supply according to the embodiment.

The operation of the uninterruptible power supply 100 according to this embodiment is now described. As shown in FIG. 6, when the abnormality detector 21 detects an abnormality in the controller 20, the abnormality detector 21 outputs a controller abnormality signal. The controller abnormality signal output from the abnormality detector 21 is input to the one-shot unit 31 (see FIG. 2) such that an H-level signal is output from the one-shot unit 31 during a period t1. Then, this H-level signal is input to the mechanical switch 2b such that the mechanical switch 2b is turned off.

As shown in FIG. 2, the one-shot signal (H-level signal) generated by the one-shot unit 31 is input to the OR circuit 32a. Thus, the OR circuit 32a outputs an H-level signal. The H-level signal output from the OR circuit 32a is input to the AND circuit 33b. The signal (pulse wave) from the oscillator 35 is input to the AND circuit 33b. Thus, the AND circuit 33b outputs a semiconductor switch drive signal.

The H-level signal output from the OR circuit 32a is input as a bypass power supply signal (H-level signal) to the AND circuit 33a. When the semiconductor switch 11 is normal, an L-level semiconductor switch abnormality signal is input to the NOT circuit 34a, and thus the AND circuit 33a receives an H-level signal from the NOT circuit 34a. When the bypass power supply is continued, an L-level bypass power supply cancellation signal is input to the NOT circuit 34b, and thus the AND circuit 33a receives an H-level signal from the NOT circuit 34b. Consequently, when the semiconductor switch 11 is normal and the bypass power supply is continued, the AND circuit 33a outputs an H-level signal. Thus, the OR circuit 32b outputs an H-level bypass power supply signal. Thus, the bypass power supply signal is latched. Consequently, the semiconductor switch drive signal is continuously generated while the bypass power supply signal is being generated. Thus, the on-state of the semiconductor switch 11 is maintained while the bypass power supply signal is being generated.

In this embodiment, as shown in FIG. 6, the signal generator 30 is configured to stop generation of the semiconductor switch drive signal based on the semiconductor switch abnormality signal indicating that the semiconductor switch 11 is abnormal. Specifically, as shown in FIG. 2, when the semiconductor switch abnormality detector 12 (see FIG. 1) detects an abnormality in the semiconductor switch 11, the semiconductor switch abnormality detector 12 outputs an H-level semiconductor switch abnormality signal. The H-level semiconductor switch abnormality signal is input to the NOT circuit 34a. Thus, the AND circuit 33a receives an L-level signal from the NOT circuit 34a, and thus the AND circuit 33a outputs the L-level signal. At this time, the signal from the one-shot unit 31 is at an L-level, and thus the OR circuit 32b outputs an L-level signal. Consequently, an output from the AND circuit 33b becomes L-level, and the semiconductor switch 11 is turned off. Thus, supply of AC power via the bypass circuit 10 is stopped.

As shown in FIG. 6, the signal generator 30 is configured to stop generation of the semiconductor switch drive signal based on the bypass power supply cancellation signal for canceling supply of AC power to the load 210 via the bypass circuit 10. Specifically, as shown in FIG. 2, the bypass power supply cancellation signal (H-level) is output from the controller 20 at an arbitrary timing. Then, the H-level bypass power supply cancellation signal is input to the NOT circuit 34b such that the AND circuit 33a receives an L-level signal from the NOT circuit 34b. Thus, generation of the semiconductor switch drive signal is stopped as in the case of the semiconductor switch abnormality signal described above. Consequently, supply of AC power via the bypass circuit 10 is stopped.

Normal Operation in this Embodiment

In this embodiment, when the AC power supply 200a (AC power supply 200b) is normal, AC power is supplied from the AC power supply 200b to the load 210 via the bypass circuit 10. That is, AC power is supplied from the AC power supply 200b to the load 210 without passing through the converter 1 and the inverter 3. When an abnormality such as the power failure of the AC power supply 200b occurs, the controller 20 controls the inverter 3 to supply AC power to the load 210.

Advantageous Effects of this Embodiment

According to this embodiment, the following advantageous effects are achieved.

According to this embodiment, as described above, the signal generator 30 is configured to continuously generate the semiconductor switch drive signal while AC power is being supplied via the bypass circuit 10. Accordingly, while AC power is being supplied via the bypass circuit 10, the on-state of the semiconductor switch 11 is maintained. Therefore, AC power can be supplied from the bypass circuit 10 to the load 210 via the semiconductor switch 11. Moreover, the on-state of the semiconductor switch 11 is maintained while AC power is being supplied via the bypass circuit 10, and thus it is not necessary to provide a mechanical switch separately from the semiconductor switch 11. Thus, AC power can be supplied from the bypass circuit 10 to the load 210 while the complex configuration is significantly reduced or prevented.

According to this embodiment, as described above, the bypass circuit 10 does not include a mechanical switch arranged in parallel to the semiconductor switch 11, and AC power is supplied to the load 210 via the semiconductor switch 11. Accordingly, the bypass circuit 10 does not include a mechanical switch, and thus the configuration of the bypass circuit 10 can be reliably simplified. Note that a control to switch supply of AC power to the load 210 from supply from the inverter 3 to supply from the bypass circuit 10 can also be simplified.

According to this embodiment, as described above, the signal generator 30 is configured to generate the bypass power supply signal indicating that AC power is being supplied via the bypass circuit 10 based on the output controller abnormality signal, and to continuously generate the semiconductor switch drive signal by latching the bypass power supply signal while generating the bypass power supply signal. Accordingly, the bypass power supply signal is latched, and thus the signal generator 30 can reliably continuously generate the semiconductor switch drive signal while generating the bypass power supply signal.

According to this embodiment, as described above, the signal generator 30 is configured to stop generation of the semiconductor switch drive signal based on the semiconductor switch abnormality signal indicating that the semiconductor switch 11 is abnormal. Accordingly, when the semiconductor switch 11 is abnormal, generation of the semiconductor switch drive signal is stopped based on the semiconductor switch abnormality signal such that supply of AC power from the bypass circuit 10 to the load 210 can be easily stopped.

According to this embodiment, as described above, the signal generator 30 is configured to stop generation of the semiconductor switch drive signal based on the bypass power supply cancellation signal for canceling supply of AC power to the load 210 via the bypass circuit 10. Accordingly, when it is desired to stop supply of AC power to the load 210 via the bypass circuit 10 (by user's discretion), supply of AC power to the load 210 via the bypass circuit 10 can be stopped based on the bypass power supply cancellation signal.

According to this embodiment, as described above, the signal generator 30 is configured to be driven by the power of any one of the DC power supply 4, the AC power supply 200a, and the AC power supply 200b. Accordingly, even when any one of the DC power supply 4, the AC power supply 200a, and the AC power supply 200b fails, the signal generator 30 can be driven by another power supply that has not failed.

According to this embodiment, as described above, when the AC power supply 200a and the AC power supply 200b are normal, AC power is supplied from the AC power supply 200b to the load 210 via the bypass circuit 10. Accordingly, when the AC power supply 200a and the AC power supply 200b are normal, AC power is supplied from the AC power supply 200b to the load 210 via the bypass circuit 10 without passing through the converter 1 and the inverter 3, and thus a power loss due to power conversion of the converter 1 and the inverter 3 can be significantly reduced or prevented.

Modified Examples

The embodiment disclosed this time must be considered as illustrative in all points and not restrictive. The scope of the present invention is not shown by the above description of the embodiment but is limited by the scope of claims for patent, and all modifications (modified examples) within the meaning and scope equivalent to the scope of claims for patent are further included.

For example, while the signal generator includes the OR circuit, the AND circuit, etc., as shown in FIG. 2 in the aforementioned embodiment, the present invention is not restricted to this. The configuration of the signal generator shown in FIG. 2 is an example, and the signal generator may alternatively have a configuration other than the configuration shown in FIG. 2.

While the signal generator is made by hardware in the aforementioned embodiment, the present invention is not restricted to this. For example, the signal generator may alternatively be made by software.

While power is supplied to the signal generator by any one of the DC power supply and the two AC power supplies in the aforementioned embodiment, the present invention is not restricted to this. For example, power may alternatively be supplied by the DC power supply and one of the two AC power supplies, both of the two AC power supplies, or the DC power supply and both of the two AC power supplies.

When the AC power supply is normal, AC power is supplied from the AC power supply to the load via the bypass circuit in the aforementioned embodiment, but the present invention is not restricted to this. For example, when the AC power supply is normal, AC power may alternatively be supplied from the AC power supply to the load via the converter and the inverter.

While the AC power supply that supplies AC power to the converter and the AC power supply that supplies AC power to the bypass circuit are provided in the aforementioned embodiment, the present invention is not restricted to this. For example, AC power may alternatively be supplied from a common AC power supply to the converter and the bypass circuit. What is claimed is:

What is claimed is:
1. An uninterruptible power supply comprising:
a converter that converts AC power from a first AC power supply into DC power;
an inverter that converts the DC power from the converter into AC power and supplies the converted AC power to a load;
a bypass circuit connected in parallel to the converter and the inverter between a second AC power supply and the load, the bypass circuit supplying the AC power from the second AC power supply to the load;
a semiconductor switch provided in the bypass circuit;
a controller configured to control driving of the semiconductor switch;
an abnormality detector that detects an abnormality in the controller; and
a signal generator that generates a semiconductor switch drive signal for driving the semiconductor switch provided in the bypass circuit, separately from a drive signal for driving the semiconductor switch from the controller when the abnormality in the controller is detected by the abnormality detector,
wherein the signal generator continuously generates the semiconductor switch drive signal from a beginning of the AC power supply via the bypass circuit to an ending of the AC power supply via the bypass circuit.

2. The uninterruptible power supply according to claim 1, wherein the semiconductor switch includes at least one semiconductor switching element, and the AC power is supplied to the load via the semiconductor switch.

3. The uninterruptible power supply according to claim 1, wherein the abnormality detector outputs a controller abnormality signal when detecting the abnormality in the controller; and
the signal generator generates a bypass power supply signal indicating that the AC power is being supplied via the bypass circuit based on the controller abnormality signal that has been output, and continuously generates the semiconductor switch drive signal by latching the bypass power supply signal while generating the bypass power supply signal.

4. The uninterruptible power supply according to claim 1, wherein the signal generator stops generation of the semiconductor switch drive signal based on a semiconductor switch abnormality signal indicating that the semiconductor switch is abnormal.

5. The uninterruptible power supply according to claim 1, wherein the signal generator stops generation of the semiconductor switch drive signal based on a bypass power supply cancellation signal for canceling supply of the AC power to the load via the bypass circuit.

6. The uninterruptible power supply according to claim 1, further comprising a DC power supply connected between the converter and the inverter, the DC power supply supplying power to the load when the AC power supply is abnormal;
wherein the AC power supply includes a first AC power supply that supplies AC power to the converter, and a second AC power supply that supplies AC power to the bypass circuit; and
the signal generator is driven by the power of any one of the DC power supply, the first AC power supply, and the second AC power supply.

7. The uninterruptible power supply according to claim 6, wherein when one of the DC power supply, the first AC power supply and the second AC power supply fails, the power is supplied to the signal generator from another of the DC power supply, the first AC power supply and the second AC power supply that is not failed.

8. The uninterruptible power supply according to claim 1, wherein the AC power is supplied from the AC power supply to the load via the bypass circuit when the AC power supply is normal.

9. The uninterruptible power supply according to claim 1, wherein the signal generator receives an abnormality signal from the abnormality detector, a semiconductor switch abnormality signal and a bypass power supply cancellation signal, and generates the semiconductor switch drive signal.

\* \* \* \* \*